J. B. KELLY.
BEARING.
APPLICATION FILED MAY 21, 1917.
1,262,208.
Patented Apr. 9, 1918.
2 SHEETS—SHEET 1.
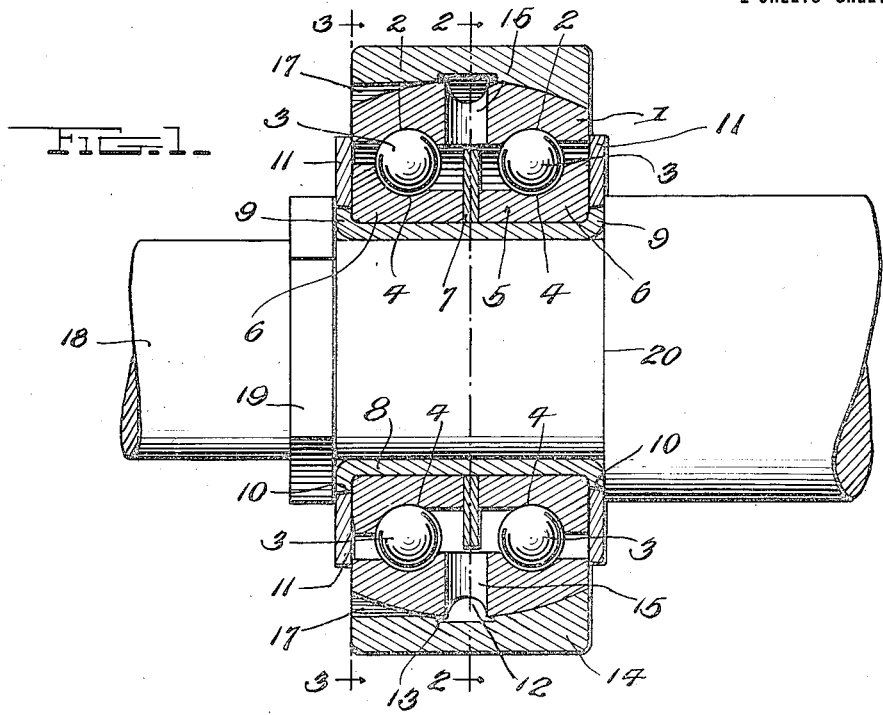
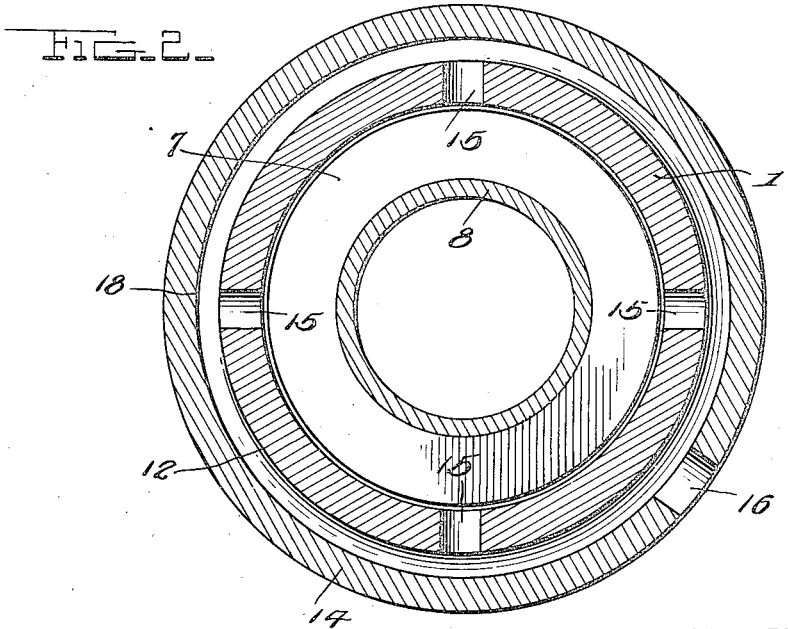
Witness
I. R. Pierce
Inventor
J. B. Kelly
By H. B. Willson & Co.
Attorneys

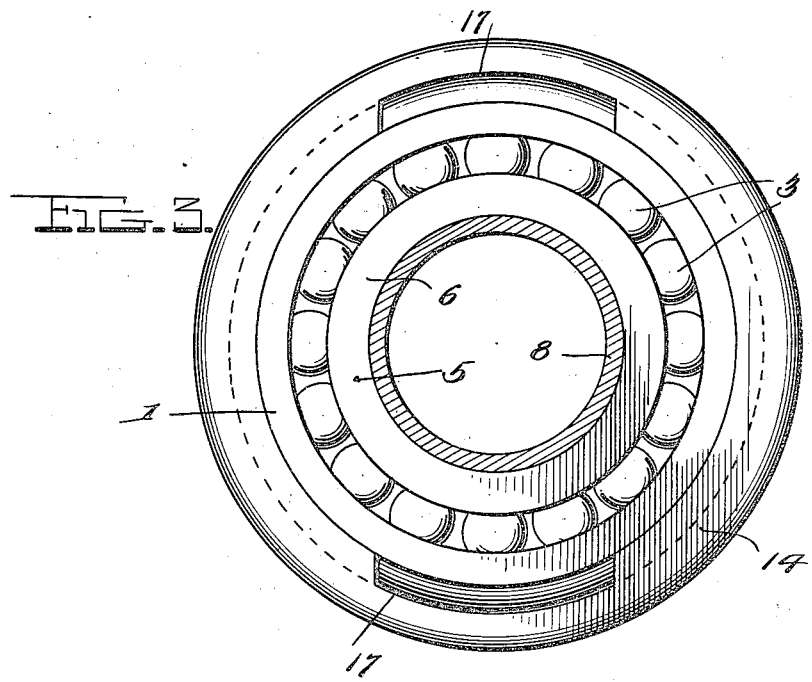
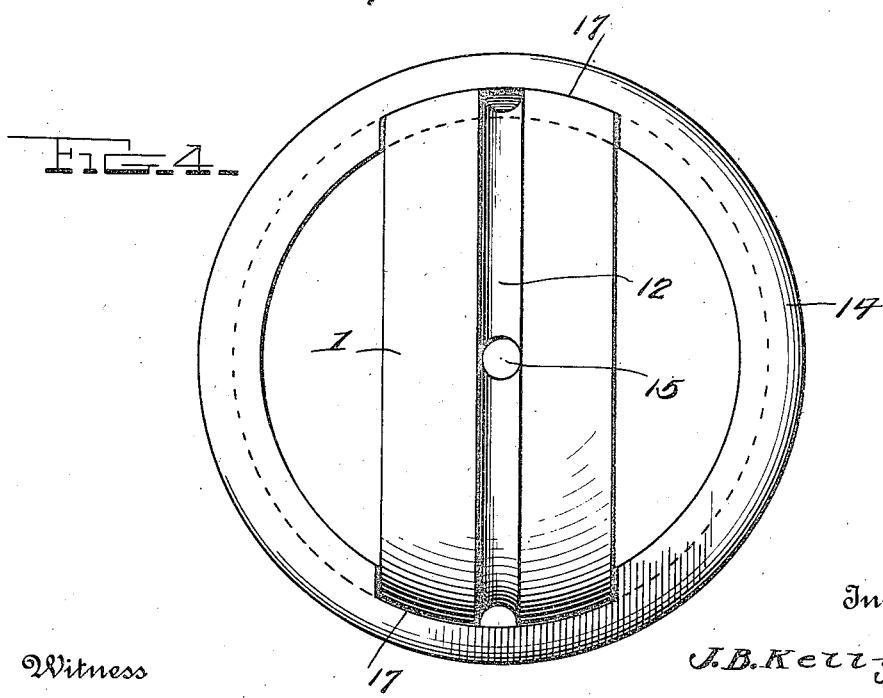

UNITED STATES PATENT OFFICE.

JOHN B. KELLY, OF SAN FRANCISCO, CALIFORNIA.

BEARING.

1,262,208. Specification of Letters Patent. Patented Apr. 9, 1918.

Application filed May 21, 1917. Serial No. 170,008.

*To all whom it may concern:*

Be it known that I, JOHN B. KELLY, a citizen of the United States, residing at San Francisco, in the county of San Francisco and State of California, have invented certain new and useful Improvements in Bearings; and I do declare the following to be a full, clear, and exact description of the invention, such as will enable others skilled in the art to which it appertains to make and use the same.

My invention has for its object to provide a ball bearing which may be easily and inexpensively manufactured, yet highly efficient and durable, possessing a number of advantageous features.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a vertical longitudinal section of the improved bearing showing the same applied to a shaft;

Figs. 2 and 3 are vertical transverse sections on the planes of the lines 2—2 and 3—3 of Fig. 1; and Fig. 4 is an end elevation of the casing ring, disclosing an edge view of the outer race ring and illustrating the manner in which the latter is inserted in said casing ring.

In the drawings above briefly described, the numeral 1 has reference to an outer race ring preferably formed of one piece of metal and having in its inner face a pair of annular ball races 2 receiving therein two annular series of bearing balls 3, said balls being in engagement with other races 4 formed in the periphery of an inner race ring 5.

The ring 5 is composed of two endwise separable annular sections 6 whose inner ends are reduced on their peripheries to permit said sections to be forced into place by pressure in the well known manner, the sections in question being sufficiently flexible to permit of the required deformation while they are being forced within the two annular series of balls 3.

A partition ring 7 is clamped between the inner ends of the sections 6 to properly space them, said ring extending across the space between the inner and outer race rings to prevent chips from a possibly broken ball, entering one race from the other. The two sections 6 and the ring 7 are held in place by a binding sleeve 8 passing through the race ring 5 and having its ends bent outwardly to form end flanges 9 contacting with the ends of said ring, the edges of said flanges being preferably beveled inwardly to a slight extent as shown at 10. A pair of flat end rings 11 are sprung over the edges of the flanges 9 by pressure, said rings extending across the space between the inner and outer race rings to prevent leakage of grease therefrom.

The outer side of ring 1 is of convex formation and has formed therein a circumferentially extending grease groove 12 registering with a similar groove 13 in the inner concave side of a casing ring 14 which surrounds said ring 1. Grease passages 15 lead from the groove 12 into the space between the two race rings 1 and 5, and the casing ring 14 is formed with an opening 16 for registration with a grease cup whereby grease is supplied to the grooves. It will thus be seen that the bearing may be at all times packed with grease. This prevents the balls 3 from dropping by gravity in the races and causing the well known "tapping" of the bearing. Whenever such tapping is heard, it is a warning that the supply of grease should be replenished and by maintaining the supply at a maximum, the bearing is practically noiseless even though none of the well known ball retainers are employed for spacing the balls apart.

Obviously, in addition to rendering the bearing noiseless, the grease lubricates the same to the required extent, and a quantity of grease is also supplied to the contacting faces of the rings 1 and 14. This permits the ring 1 to creep circumferentially in the casing ring and thus the races 2 will be evenly worn rather than assuming the elliptical formation which often happens with bearings of the types now in use. Furthermore, the bearing may angle in the ring 14 and thus is self-alining for bent or sprung shafts.

For inserting the ring 1 into the casing ring 14, the latter is provided with a pair of notches 17 located at diametrically opposite points and leading through one end of the ring from the largest internal diameter thereof. The notches 17 are of the same width as ring 1, and as shown clearly in Fig. 4, said ring 1 is inserted edgewise into these notches. It is then turned into the plane of ring 14 in which position it remains while operating. The distance, measured diametrically, between the bottoms of the notches 17 is slightly less than the largest diameter of the ring 1 so that the latter must be forced into said notches by power and will sufficiently seal them to prevent escape of grease therethrough.

In applying the improved bearing, the sleeve 8 is passed over the shaft 18 and by means of a nut 19, said sleeve is clamped against an external shoulder 20 on the shaft. This clamping increases the binding action of the sleeve and forms a rigid structure of the two ring sections 6 and the partition ring 7.

From the foregoing, taken in connection with the accompanying drawings, it will be obvious that although the invention is of comparatively simple and inexpensive nature, it will be highly efficient and will possess a number of advantageous characteristics. Since the best results are obtained from the construction shown, this construction forms the preferred embodiment of the bearing, but it is to be understood that within the scope of the invention as claimed, numerous changes may be made without sacrificing the principal advantages. Furthermore, I wish it understood that although I have described the invention as a ball bearing, it might well be constructed in some instances by using rollers in place of the bearing balls shown and described. It is to cover both constructions that I have used the term "rolling bearing members" in the claims.

I claim:

1. A bearing comprising inner and outer race rings, one being formed of two annular sections, an annular series of rolling bearing members between each of said sections and the other race ring, and a partition ring clamped between said sections of the one race ring and extending to the other to prevent chips of a possibly broken bearing member entering one race from the other.

2. A bearing comprising inner and outer race rings and rolling bearing members between them, said inner ring being formed of endwise separable sections, a binding sleeve passing through said inner race ring and having its ends bent outwardly to form end flanges in contact with the ends of said inner ring, and a pair of flat end rings pressed over the edges of said end flanges and closing the space between the inner and outer race rings.

3. In a bearing, the combination of inner and outer race rings of equal width and rolling bearing members therebetween, said outer ring having a circumferentially extending grease groove in its periphery and grease passages leading from said groove into the space between the two rings, a casing ring surrounding said outer race ring and of the same width as the race rings, said casing ring having means for admitting grease into said groove, and end rings contacting with the edges of said race rings to prevent leakage of grease between the two.

In testimony whereof I have hereunto set my hand in the presence of two subscribing witnesses.

JOHN B. KELLY.

Witnesses:
W. W. HEALEY,
M. E. EWING.